United States Patent [19]

Garber, Jr.

[11] Patent Number: 5,316,178
[45] Date of Patent: May 31, 1994

[54] FRUIT RIPENING ETHYLENE GAS STORAGE AND DISPENSING SYSTEM AND CONTAINER THEREFOR

[76] Inventor: Edward E. Garber, Jr., 5415 Linton Rd., Sykesville, Md. 21784

[21] Appl. No.: 924,964

[22] Filed: Aug. 5, 1992

[51] Int. Cl.$^5$ .............................................. B67D 5/00
[52] U.S. Cl. ......................................... 222/3; 99/467; 206/523; 220/481; 220/581
[58] Field of Search .................... 222/3, 131, 183, 396; 220/581, 445, 444, 476, 480, 481, 901; 206/521, 523, 524; 99/467, 473, 474; 426/312

[56] References Cited

U.S. PATENT DOCUMENTS

| | | | |
|---|---|---|---|
| 3,942,669 | 3/1976 | Savage, Jr. | 220/481 |
| 3,951,610 | 4/1976 | Freebairn et al. | 23/281 |
| 4,764,389 | 8/1988 | LaBarge | 99/474 X |
| 4,905,855 | 3/1990 | Troiano et al. | 220/581 |
| 4,964,529 | 10/1990 | Houston | 220/444 X |

*Primary Examiner*—Gregory L. Huson
*Attorney, Agent, or Firm*—Morton J. Rosenberg; David I. Klein

[57] ABSTRACT

A fruit ripening system (100) is provided for ripening fruit with ethylene gas (30). The fruit ripening system (100) includes an outer housing (110) having a frontal wall (112) pivotedly coupled to side wall (120) by a hinge (114). Interior to housing (110) there is provided an interior resilient support member (132) having a plurality of cutout portions (136, 140, 142) for respective receipt of portions of ethylene storage and dispensing assembly (150). Shoulder portions (138, 144 and 146) are provided for engaging recess portions formed in ethylene storage and dispensing assembly (150) for securely engaging assembly (150) within the cutout portions formed in resilient member (132). A resilient cover member (134) coupled to the frontal wall member (112) is provided to provide a resilient closure for the cutout openings (136, 140 and 142). Ethylene storage and dispensing assembly (150) is provided with a flow control assembly (160) which is preadjusted to provide a predetermined flow rate through a funnel shaped nozzle (172) sealingly engaged with a through opening (148) formed in resilient member 134 and axially aligned with a through opening (116) formed in frontal wall member (112) for dispensing of the ethylene gas therethrough.

16 Claims, 3 Drawing Sheets

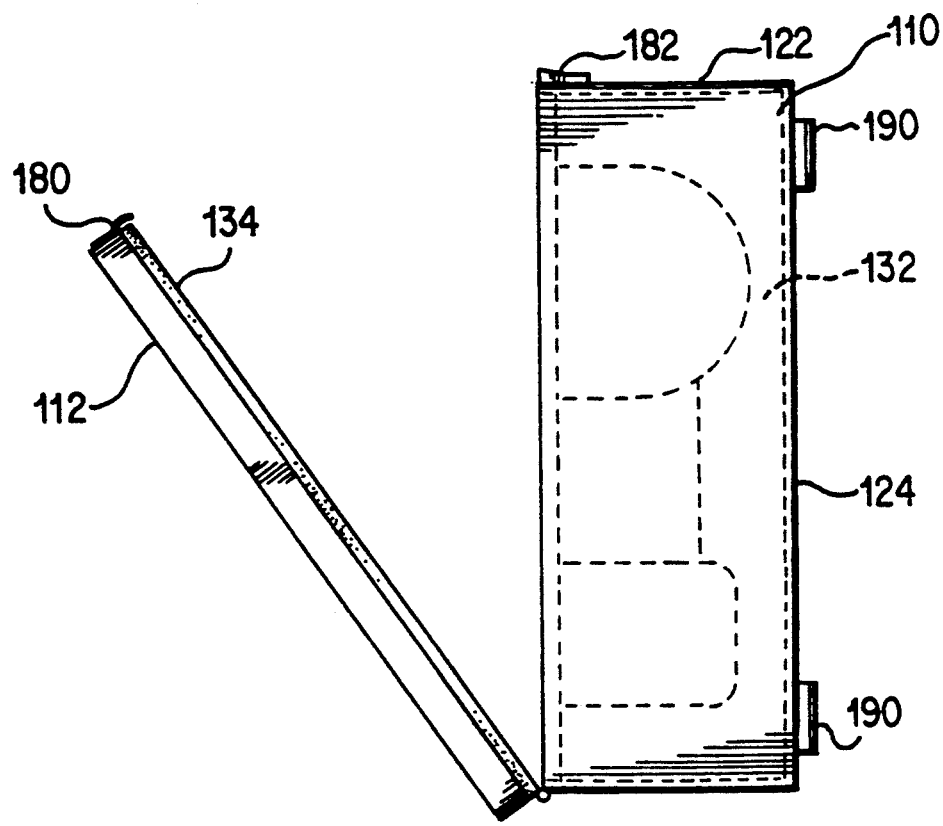
FIG. 4
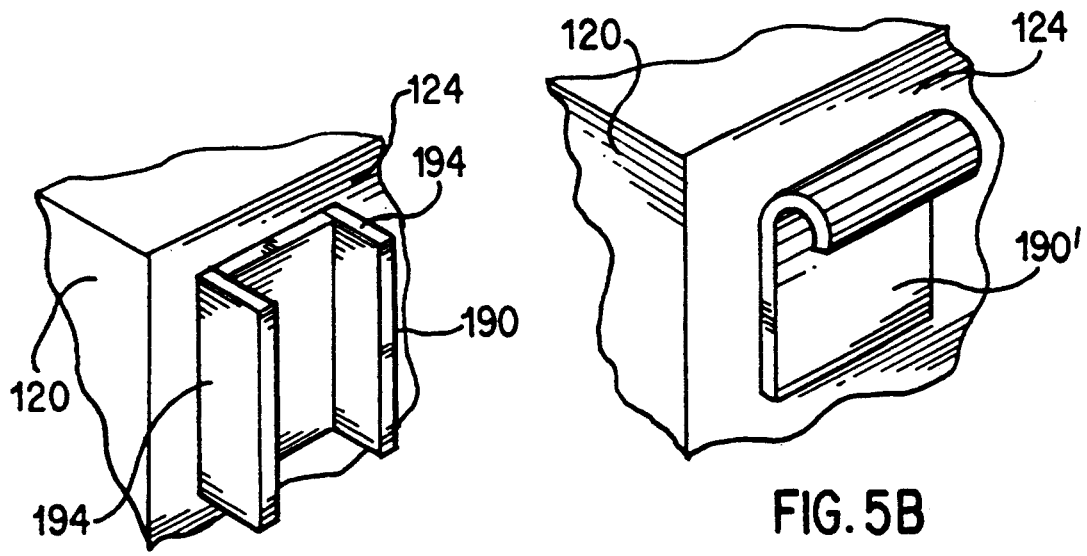
FIG. 5A
FIG. 5B

FRUIT RIPENING ETHYLENE GAS STORAGE AND DISPENSING SYSTEM AND CONTAINER THEREFOR

BACKGROUND OF THE INVENTION

1. Field of the Invention

This invention directs itself to a system for ripening fruit with ethylene gas. In particular, this invention directs itself to a modular preset ethylene gas dispensing system and container therefor. Still further, this invention directs itself to a container housing an ethylene storage cylinder and flow control assembly adapted to resiliently support the ethylene dispensing assembly, both while in use and during shipment. More in particular, this invention pertains to an ethylene storage and dispensing assembly supported within a container having a resilient support structure adapted to interlock with the ethylene storage and dispensing assembly. Further, this invention directs itself to a resilient support structure for absorbing externally generated vibration, immobilizing the ethylene storage and dispensing assembly, and sealingly interfacing an outlet orifice of the container with the ethylene outlet nozzle of the ethylene storage and dispensing assembly.

2. Prior Art

Containers for compressed gas cylinders are well known in the art, as are fruit ripening systems utilizing ethylene gas. The best prior art known to the Applicant includes U.S. Pat. Nos. 3,620,765; 4,764,389; 4,967,923; 4,779,524; 4,094,119; 3,951,610; 4,400,291; 4,905,855; 4,824,685; 5,041,298; 4,411,918; 4,748,904; 5,007,548; and, 4,964,529.

Some prior art systems such as that shown in U.S. Pat. Nos. 5,041,298; 4,824,685; 4,779,524; 4,764,389; and, 3,621,765 are directed to systems for ripening fruit with ethylene gas. In each system the containers of fruit are disposed within a specially designed storage room or pallet arrangement for exposing the fruit to the ethylene gas. Such systems do not provide for ethylene gas packaging containers adapted for releasable coupling within a transport vehicle, the container further serving as a means for transporting the ripening system to the end user and back therefrom for recycling, as provided in the instant invention.

In other prior art systems such as that disclosed by U.S. Pat. Nos. 4,967,923; 4,964,529; and, 4,905,885, there is disclosed safety containers for compressed gas cylinders. Such systems may include resilient packing inserts for absorbing vibration, but are not designed to be utilized for both shipping and dispensing of the gas contained within the storage cylinder. Whereas in the instant invention the resilient supporting members serve multiple functions and provide for interlocking engagement with the gas storage cylinder and flow control assembly.

SUMMARY OF THE INVENTION

A fruit ripening system and container is provided for ripening fruit during transport thereof. The fruit ripening system includes an outer housing in the form of a paralepiped and has a frontal wall hingedly coupled to a first side wall for providing access to an interior cavity of the housing. The fruit ripening system further includes means for releasably securing the frontal wall to at least one second side wall. An ethylene storage and dispensing assembly is disposed within the housing cavity and supported therein by a resilient support assembly.

It is an object of the invention to provide a prepackaged fruit ripening system which is easily installed in a transport vehicle.

It is another object of the invention to provide a fruit ripening system to an end user which is preset to dispense ethylene gas at a flow rate which has been predetermined to provide a desired degree of fruit ripening during the span of time the fruit is in transport.

It is a further object of the invention to provide a container for an ethylene gas dispensing apparatus which serves the dual role of a shipping package and a support for the dispensing apparatus when in use.

It is yet another object of the invention to provide a container having a resilient support assembly for absorbing externally generated shock and vibration, as well as substantially immobilizing the ethylene gas dispensing apparatus.

It is still a further object of the invention to provide a resilient support assembly that additionally functions as a seal between an outlet of the ethylene dispensing apparatus and the outer housing to prevent accumulation of the gas therein.

BRIEF DESCRIPTION OF THE DRAWINGS

FIG. 4 is a top plan view of the fruit ripening system;

FIG. 5A is a perspective view, partially cutaway, of a corner portion of the fruit ripening system container showing a releasable coupling element; and, FIG. 5B is a perspective view, partially cutaway, of a corner portion of the fruit ripening system container showing an alternate releasable coupling element.

DESCRIPTION OF THE PREFERRED EMBODIMENTS

Figure 1:
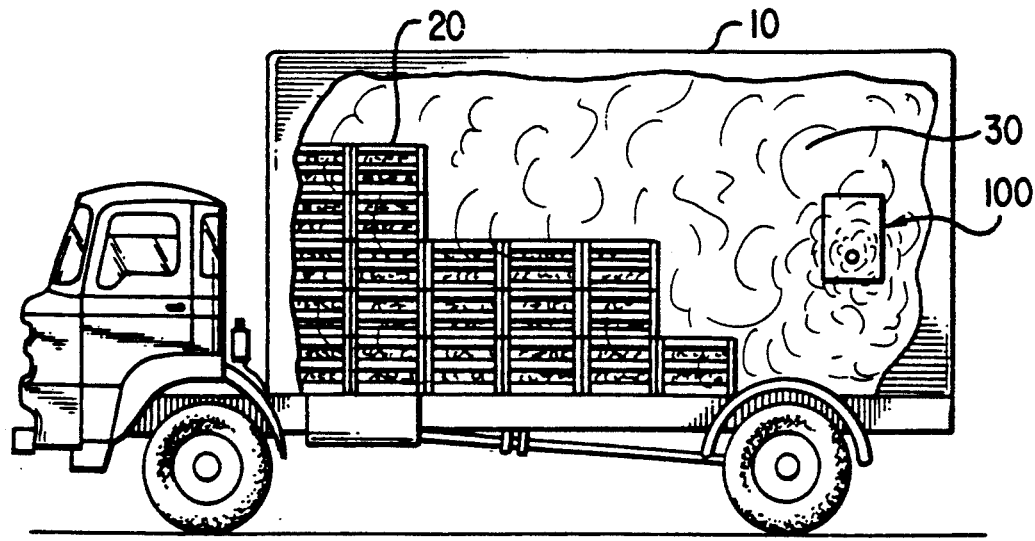
FIG. 1 is a partial cutaway view of the fruit ripening system in use.

Referring to FIGS. 1-5, there is shown fruit ripening system 100 removably mounted within a vehicle 10, for dispensing ethylene gas 30 at a predetermined rate of flow to ripen fruit disposed within a plurality of shipping crates 20. As will be seen in following paragraphs, fruit ripening system 100 is particularly adapted for providing a compact, modular, cost effective fruit ripening system. The container 110 serves a dual purpose of (1) providing the means by which the ethylene storage and dispensing assembly 150 can be conveniently mounted within the vehicle 10 for use in ripening fruit, and (2) providing a suitable shipping container for transporting the ethylene storage and dispensing assembly to the end user, and subsequent to dispensing of the ethylene gas previously stored therein, shipping the assembly back for refilling and subsequent transport back to the end user.

Referring now to FIG. 1, there is shown fruit ripening system 100 disposed within the cargo area of a truck 10. Within the cargo area of truck 10 there is provided a plurality of crates 20 containing fruit, such as bananas, which are ripened through exposure to ethylene gas 30 being dispensed from fruit ripening system 100 during their transport. The crates 20 are formed with a plurality of openings through which the ethylene gas 30 permeates for subsequent absorption by the fruit contained therein. As will be described in following paragraphs, fruit ripening system 100 is provided to the end user in prepackaged form, the flow rate of ethylene gas dispensed therefrom having been predetermined to provide the desired degree of ripening during the period of time that the fruit is transported. Thus, fruit ripening system 100, having a sufficient quantity of ethylene gas and a flow rate which has been preset to provide the desired degree of ripening during the time that the fruit is in transport, offers the end user an efficient cost effective method for ripening fruit prior to its delivery.

Figure 2:
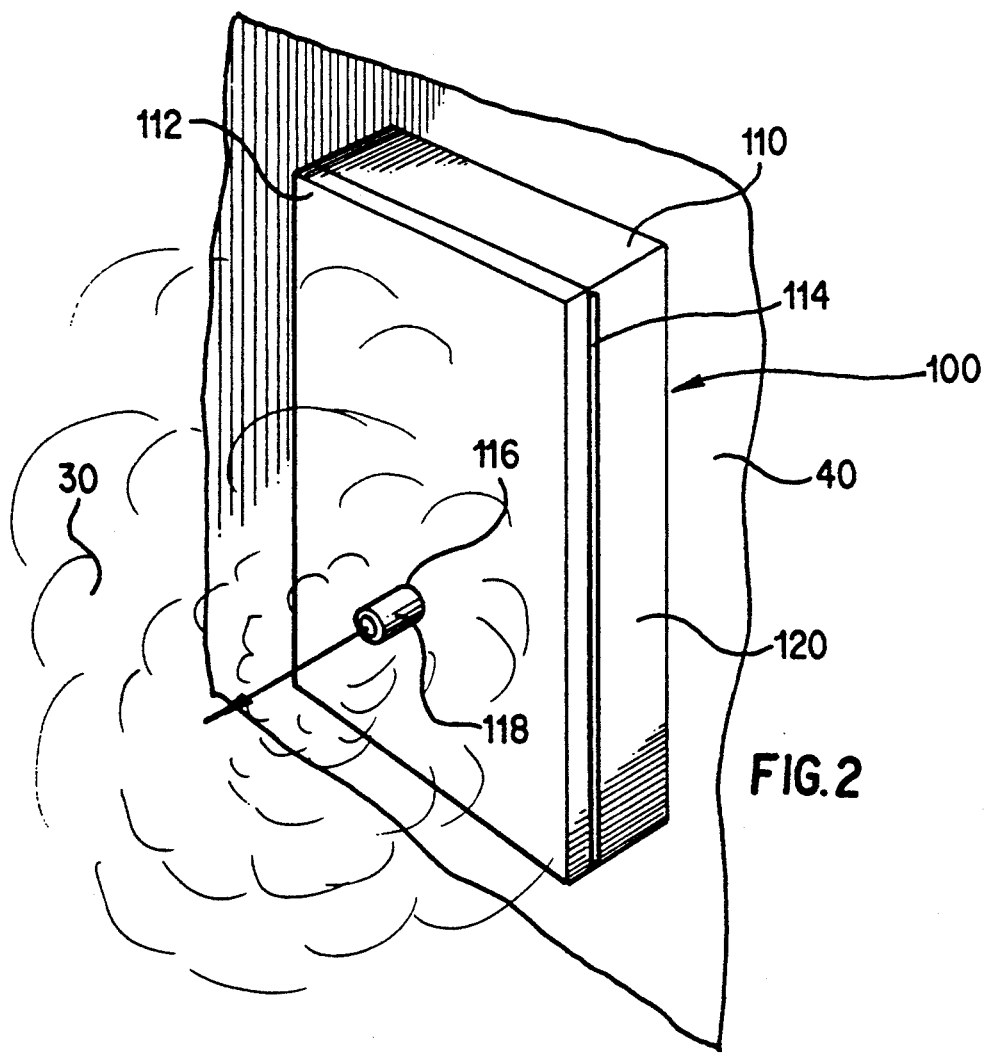
FIG. 2 is a perspective view of the fruit ripening system.

Referring now to FIGS. 2 and 4, there is shown fruit ripening system 100 mounted to a vertical support surface 40, such as the side wall of the cargo portion of vehicle 10. As will be described in following paragraphs, container 110 is adapted for releasable coupling to vertical support surface 40. Container 110 defines an outer housing for fruit ripening system 100, and includes a frontal wall 112 pivotedly coupled to a side wall 120 by means of a hinge 114. While hinge 114 is shown as being a singular unit extending substantially the entire length of housing 110, frontal wall 112 may be coupled to side wall 120 by two or more vertically spaced hinges in place of the singular hinge unit 114.

Frontal wall 112 is provided with a through opening 116 for passage of ethylene gas 30 therethrough. A removable nozzle 118 may also be provided to provide a particular gas dispersion pattern, if desired. Nozzle 118 may be releasably coupled to frontal wall 112 by any of a plurality of methods, not important to the inventive concept, such as by frictional fit, threads or the like. Although not important to the inventive concept, housing 110 may be formed from any one of a plurality of materials, such as metal, wood or certain engineering plastic material compositions.

Figure 3:
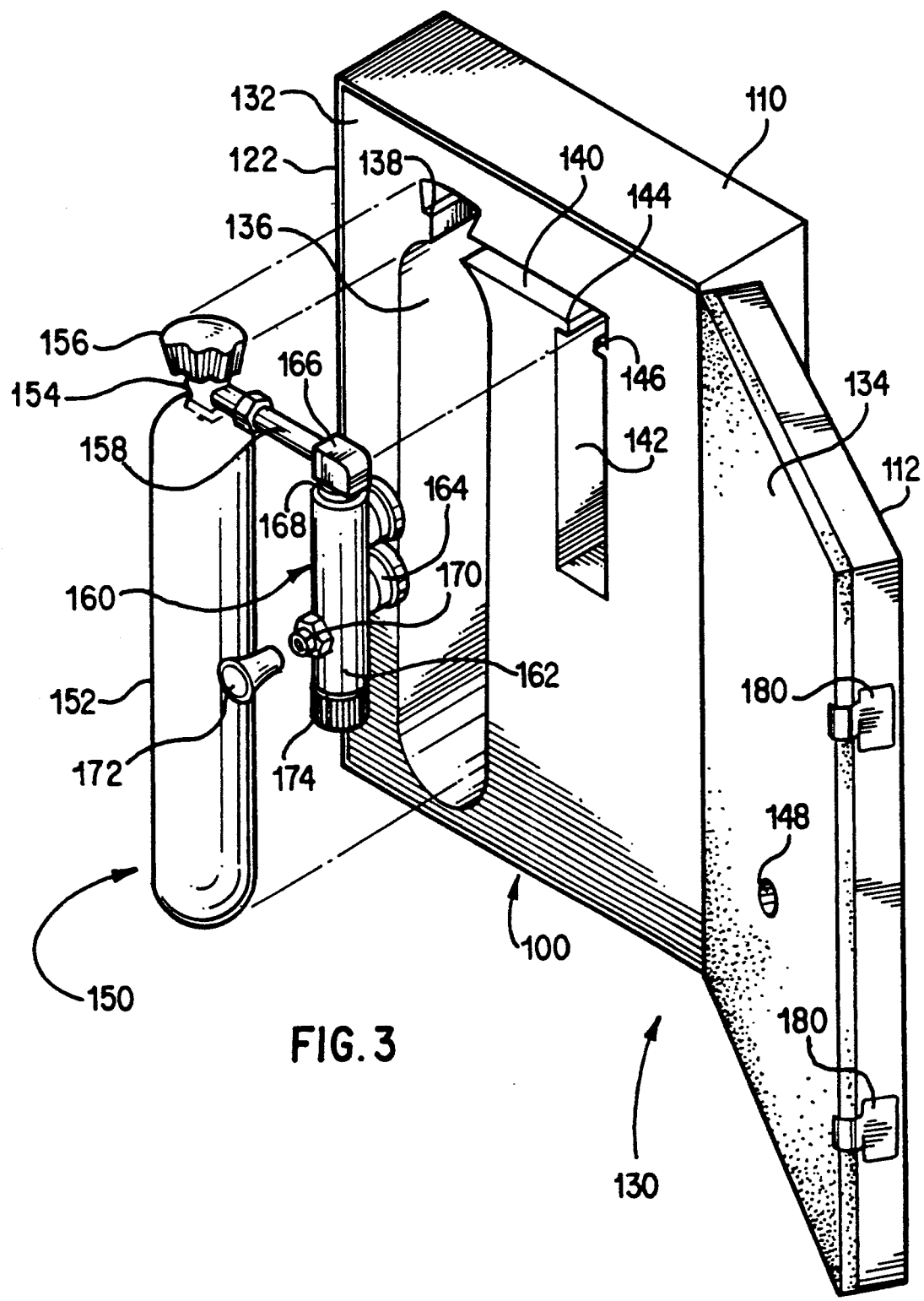
FIG. 3 is a partially exploded perspective view of the fruit ripening system.

Fruit ripening system 100 includes ethylene storage and dispensing assembly 150, shown in FIG. 3, disposed within housing 110 for dispensing ethylene gas through frontal wall opening 116, and nozzle 118 if such is utilized. Ethylene storage and dispensing assembly 150 includes a high pressure storage tank 152 provided with a valve assembly 154, the valve 154 being operable by means of the knob 156. The ethylene gas stored within storage tank 152 is provided to the flow control assembly 160 when the valve 154 is opened, the gas passing through the conduit 158 to the inlet fitting 166 of flow control assembly 160. Inlet fitting 166 directs the high pressure ethylene gas to the inlet side of the flow control regulator 162. The flow control regulator 162 is adjusted to provide a predetermined flow rate of ethylene gas from the outlet 170. Flow control assembly 160 may include one or more pressure gauges 164, utilized in providing the preset flow rate.

Housing 110 includes a resilient support assembly 130 comprising an interior resilient support member 132 adapted to receive the ethylene storage and dispensing assembly 150 therein, and a resilient support cover member 134 coupled to the frontal wall 112 for overlaying the interior resilient support member 132, capturing the ethylene storage and dispensing assembly 150 therebetween. Both resilient support members 132 and 134 are formed of a foamed plastic material composition. Resilient support member 132 is provided with a plurality of cutout portions, each having a contour adapted to receive a respective portion of the ethylene storage and dispensing assembly 150.

In particular, an opening 136 is formed in resilient support member 132 for receiving high pressure storage cylinder 152, valve 154 and knob 156. Another cutout portion 142 formed in interior resilient member 132 is contoured to receive flow control assembly 160, and a transitional cutout 140 interconnects the cutout portions 136 and 142, for receiving the conduit member extending between storage tank 152 and flow control assembly 160. The resilient support cover member 134 provides a closure for the openings 136, 140 and 142 to fully surround ethylene storage and dispensing assembly 150 with shock and vibration absorbing material. Resilient support members 132 and 134 function together to provide shock absorption for ethylene storage and dispensing system 150, both during use and when such is being shipped to the end user.

In addition to providing shock absorption, resilient support assembly 130 provides immobilization of the ethylene storage and dispensing assembly 150 which is critically important for shipment of fruit ripening system 100 to the end user. Shipment of gas stored at high pressures is hazardous, and is compounded when the gas, such as ethylene gas, is flammable. It is of critical importance that the ethylene gas storage and dispensing assembly 150 be immobilized within the cutout portions 136, 140 and 142. To this end, the contour of cutout portion 136 is provided with a protruding shoulder portion 138 which extends into a recessed area disposed between the high pressure storage tank 152 and knob 156, defined by the valve 154. To insure against rotative displacement of flow control assembly 160 relative to storage tank 152, such is engaged between protruding shoulder portions 144, 146 formed in the cutout portion 142. Protruding shoulder 144, 146 may be formed by a pair of opposing shoulder portions formed in the opposing side walls of cutout 142, or alternately may be a continuous U-shaped shoulder extending about the side and back walls of cutout 142. Protruding shoulders 144, 146 extend into a recess 168 formed between the inlet fitting 166 and the body of the flow control regulator 162. Thus, when ethylene storage and dispensing assembly 150 is disposed within the housing 110, such is protected from externally induced shock and vibration, and displacement which would otherwise result therefrom. The shock absorption and immobilization of ethylene storage and dispensing assembly 150 provided by resilient support assembly 130 thereby makes system 100 far less susceptible to hazardous leaks.

Although not shown, an additional cutout portion may be provided in resilient support member 132 for storage of removable nozzle member 118, where such is supplied, during shipment to and from the end user.

Flow control assembly 160 includes a funnel shaped nozzle 172 releasably coupled to the outlet 170 for directing the ethylene gas from outlet 170 through an opening 148, formed in resilient support cover member 134 and axially aligned with through opening 116 formed in frontal wall member 112, for dispensing the ethylene gas to the environment external container 110. The smallest diameter end of funnel shaped nozzle 172 is releasably coupled to the outlet 170 of the flow control regulator 162. The largest diameter end of funnel shaped nozzle 172 abuts the through opening 148 formed in the resilient support cover member 134, and is of a diameter larger than opening 148 such that the resilient material surrounding opening 148 provides a seal around the largest diameter end of nozzle 172. This arrangement provides the important function of preventing any accumulation of ethylene gas within the cavities 136, 140 and 142 formed in the resilient support member 132, thereby avoiding any hazard which would otherwise be present if the flammable gas was unexpectedly present within the housing.

As previously disclosed, ethylene storage and dispensing assembly 150 is provided to the end user within container 110 having a predetermined quantity of ethylene and with the flow control regulator 162 preadjusted to provide the necessary ethylene flow rate to provide a predetermined degree of ripening during the time span the fruit is being transported within the vehicle 10. Flow control regulator 162 may be adjusted utilizing the knob 174, which may include means to preclude subsequent adjustment by the end user, or alternately, regulator 162 may be adapted for adjustment through the use of a special tool, not provided to the end user. Thus, subsequent to mounting the container 110 within the vehicle 10 the end user unlatches the frontal wall 112, releasing the latch member 180 from member 182, shown in FIGS. 3 and 4, to gain access to the storage cylinder 152 and subsequently open the valve 154 by rotation of knob 156. Alternately, ethylene storage and dispensing system 150 may be provided with an additional valve (not shown) accessible through an opening in container 110 for enabling the flow of ethylene gas from storage cylinder 152 to flow control assembly 160. Where access to a valve is provided through an opening in container 110, latch members 180, 182 would be replaced by lock assemblies to prevent the end user from access to the interior of container 110.

Referring further to FIG. 4, there is shown releasable coupling elements 190 disposed on rear wall member 124 of container 110. Releasable coupling elements 190 may be in the form of a magnetic coupling assembly, as shown in FIG. 5A. Magnetic coupling assembly 190 is defined by a magnetic member 192 disposed between a pair of pole elements 194, the pole elements 194 extending laterally beyond magnetic element 192 for engaging a ferrous metallic vertical support surface 40. Alternately, releasable support elements 190 may be in the form of hook-like members 190', shown in FIG. 5B. Hook elements 190' have an inverted J-shaped contour for releasable coupling with slotted openings, horizontal bar members, or loop-shaped members affixed to vertical support surface 40. Other types of coupling systems may be used, such as hook and loop type fasteners or slotted openings for receiving a stud extending from the vertical support surface 40.

Thus, container 110 provides a functional package for dispensing the fruit ripening ethylene gas, transporting the ethylene gas to the end user, and return transport of the depleted ethylene storage tank for recycling. Critically important to accomplishing the multifunctional aspects of container 110 is the adaptation of the interior resilient support member 132 having a shoulder portion 138 extending into a recess formed between the high pressure cylinder 152 and knob 156, and a shoulder portion 144, 146 extending from the opposing side walls of the cutout portion 142 into a recess 168 formed between the inlet fitting 166 and the flow control regulator body 162 of flow control assembly 160. These shoulder portions 138, 144 and 146 provide an interlocking engagement with the ethylene storage and dispensing assembly 150 to provide resilient constraint thereof.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A fruit ripening system and container therefore, comprising:

an outer housing in the form of a paralelepiped and having a frontal wall hingedly coupled to a first side wall for providing access to an interior cavity of said housing, said frontal wall having a through opening formed therein for passage of ethylene gas therethrough;

means for releasably securing said frontal wall to at least one second side wall;

means for ethylene gas storage and dispensing disposed within said housing cavity, said means for ethylene gas storage and dispensing including (1) an ethylene gas cylinder having a valve for controlling release of ethylene gas therefrom, (2) a flow control assembly having an input fluidly coupled to said valve for dispensing said ethylene gas at a predetermined rate, and (3) a nozzle member fluidly coupled to an output of said flow control assembly; and, means for resiliently supporting said ethylene storage and dispensing means within said housing cavity, said resilient support means including a first resilient support member disposed within said housing cavity, said first resilient support member having a truncated U-shaped opening formed therein for receipt of said ethylene storage and dispensing means therein, said resilient support means further including a second resilient support member coupled to an interior face of said frontal wall for providing a resilient closure for said truncated U-shaped opening of said first resilient support member.

2. The fruit ripening system and container as recited in claim 1 where both said first and second resilient support members are formed from a foamed plastic material composition.

3. The fruit ripening system and container as recited in claim 1 wherein said truncated U-shaped opening is defined by (1) a first cutout adapted to receive an ethylene gas cylinder, (2) a second cutout adapted to receive a flow control assembly, and (3) an transitional cutout extending between said first and second cutouts for receipt of a conduit member connecting said ethylene gas cylinder to said flow control assembly.

4. The fruit ripening system and container as recited in claim 3 where said first cutout is formed with a first shoulder portion extending from one side of said first cutout for lockingly engaging said ethylene gas cylinder within a recess defined by a valve portion thereof.

5. The fruit ripening system and container as recited in claim 4 where said second cutout is formed with at least one second shoulder portion extending from at least one side of said second cutout for lockingly engaging said flow control assembly within a recess formed therein.

6. The fruit ripening system and container as recited in claim 1 where said second resilient support member is formed with a through opening aligned with both said frontal wall through opening and said nozzle member for dispensing said ethylene gas external said housing.

7. The fruit ripening system and container as recited in claim 6 where said nozzle member is a funnel shaped member releasably coupled to said flow control assembly, said funnel shaped member having an outlet diameter dimension greater than a diameter dimension of said aligned through openings in said frontal wall and said second resilient support member, whereby said second resilient support member provides a seal around said nozzle outlet.

8. A fruit ripening system and container therefore, comprising:
    an outer housing in the form of a paralelepiped and having a frontal wall hingedly coupled to a first side wall for providing access to an interior cavity of said housing, said frontal wall having a through opening formed therein for passage of ethylene gas therethrough;
    means for releasably securing said frontal wall to at least one second side wall;
    an ethylene storage gas cylinder disposed within said housing cavity;
    a flow control assembly having an input fluidly coupled to said ethylene storage gas cylinder;
    a nozzle member coupled to said flow control assembly and being in fluid communication with an output thereof, said flow control assembly being disposed within said housing cavity; and,
    means for resiliently supporting both said ethylene storage gas cylinder and said flow control assembly within said housing cavity.

9. The fruit ripening system and container as recited in claim 8 where said resilient support means includes a first resilient support member disposed within said housing cavity.

10. The fruit ripening system and container as recited in claim 9 where said first resilient support member has a truncated U-shaped opening formed therein for receipt of said ethylene storage gas cylinder and said flow control assembly therein.

11. The fruit ripening system and container as recited in claim 10 where said resilient support means further includes a second resilient support member coupled to an interior face of said frontal wall for providing a resilient closure for said truncated U-shaped opening of said first resilient support member, said second resilient support member having a through opening formed therein aligned with said frontal wall through opening.

12. The fruit ripening system and container as recited in claim 11 where said truncated U-shaped opening is defined by (1) a first cutout adapted to receive said ethylene storage gas cylinder, (2) a second cutout adapted to receive said flow control assembly, and (3) an transitional cutout extending between said first and second cutouts for receipt of a conduit member connecting said ethylene storage gas cylinder to said flow control assembly.

13. The fruit ripening system and container as recited in claim 12 where said first cutout is formed with a first shoulder portion extending from one side of said first cutout for lockingly engaging said ethylene storage gas cylinder within a recess defined by a valve portion thereof.

14. The fruit ripening system and container as recited in claim 13 where said second cutout is formed with at least one second shoulder portion extending from at least one side of said second cutout for lockingly engaging said flow control assembly within a recess formed therein.

15. The fruit ripening system and container as recited in claim 8 further comprising means for releasably coupling said housing to a vertically directed support surface.

16. The fruit ripening system and container as recited in claim 15 where said means for releasably coupling said housing to a vertically directed support surface includes means for magnetically securing said housing to said support surface.

* * * * *